June 6, 1944.  F. D. JOESTING  2,350,615
PNEUMATIC CONTROL DEVICE
Filed June 10, 1942
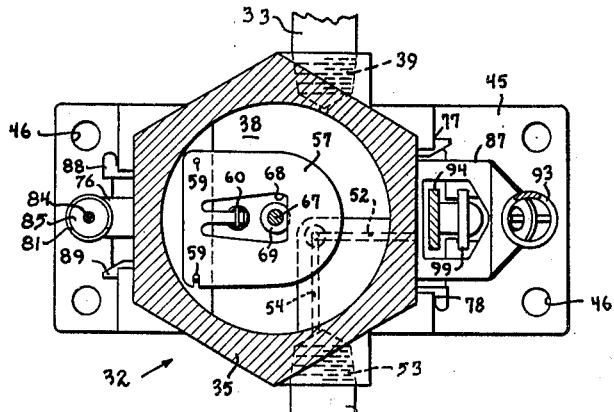
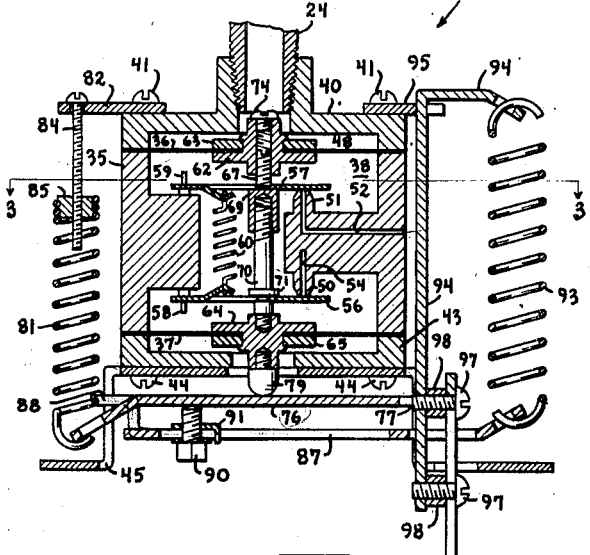
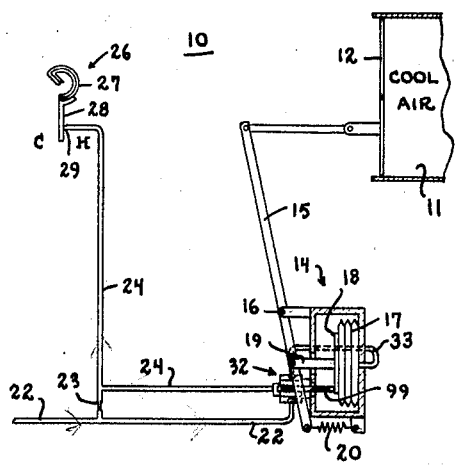
INVENTOR.
Frederick D. Joesting
BY
George H. Fisher
Attorney Patented June 6, 1944

2,350,615

UNITED STATES PATENT OFFICE 2,350,615

PNEUMATIC CONTROL DEVICE

Frederick D. Joesting, Oak Park, Ill., assignor to Minneapolis-Honeywell Regulator Company, Minneapolis, Minn., a corporation of Delaware Application June 10, 1942, Serial No. 446,462

15 Claims. (Cl. 121—41)

This invention relates to automatic controls and particularly relates to controls of the fluid pressure actuated type which use a suitable medium such as air or liquid under pressure or vacuum as the controlling medium.

It is an object of this invention to provide a pressure actuated valve assembly for a fluid pressure controller which is sensitive in operation and which may be adjusted readily after assembly.

It is a further object of the invention to provide such a device which may be constructed relatively inexpensively and which may form the basis for several devices which may be used for various control functions.

A more specific object of the invention is to provide a pressure-actuated control device in which a pair of valves are actuated by movements of a diaphragm with a novel provision for adjusting the relative positions of the diaphragm at which each valve is actuated.

A further object is to provide such a device which is adapted to act to assure a definite motor position for each value of a control pressure.

Other objects will be apparent from this specification, including the annexed claims taken together with the drawing, in which Figure 1 shows an embodiment of the present invention incorporated in an air-conditioning system.

Figure 2 is a longitudinal sectional view of the invention as applied to a positive positioning device, or pneumatic-mechanical relay, and Figure 3 is a transverse sectional view of the same device, the section being taken in a plane indicated by line 3—3 of Figure 2.

Devices which perform the function accomplished by the device of the present invention are well known in the art, as illustrated by the patent to Stanley W. Nickells, No. 2,280,345.

Pneumatic relays employing a pair of spaced diaphragms which actuate inlet and exhaust valves are also well known, as illustrated in my copending application, Serial No. 282,635, filed July 3, 1939, now United States Patent No. 2,286,282; issued June 16, 1942. The device to be described is, in some respects, similar to those described in the last mentioned application, and features of this invention may be employed to perform all the functions therein described, but the present device is simpler in construction and more economical to build.

The illustrative embodiment of the invention is a pneumatic relay adapted to accurately position a pneumatic motor in accordance with a variable control pressure which may be supplied from the branch line of a pneumatic thermostat. Branch line pressure is impressed on a diaphragm and this pressure is counter-balanced by a force depending on the actual position of the motor: the position of this diaphragm determines whether pressure is admitted to the pneumatic motor or exhausted therefrom. When the force on the diaphragm due to branch line pressure and the opposing force due to the actual motor position are in balance, both the supply and exhaust valves of the relay are closed, which means that the proper pressure has been supplied to the motor to obtain the position required for this branch line pressure. Thus, the motor position depends only on branch line pressure and is independent of the force necessary to position the device being controlled.

Figure 1 of the drawing shows a device of this type incorporated in an air-conditioning system. Cool air is supplied to a space 10 from some suitable source through a duct 11. A damper 12 controls the flow of cool air from the duct 11. A pneumatic damper motor 14 positions the damper 12 through an arm 15 which is pivoted at 16. Damper by means of motor 14 comprises a bellows 17 acting on a pressure plate 18 to position the arm 15 by means of a rod 19. Expansion of the bellows 17 is opposed by a spring 20 which tends to rotate the arm 15 in a counter-clockwise direction. If there is no resistance to movement of the arm 15, the position of the arm will depend on and be proportional to the ratio of the pressure within the bellows 17 to the pressure of the circumambient atmosphere.

Compressed air at some suitable pressure such as 15 pounds is supplied through a pipe or line 22. Air passes from the supply line 22 through a restriction 23 to a branch line 24, and the pressure in the branch line 24 is varied by a space thermostat 26 in a manner well known in the art. As the space temperature increases, a bimetallic element 27 moves a flapper valve 28 in a counter-clockwise direction to approach a nozzle 29 located at the end of the branch line 24. This action reduces the amount of air flowing out of the nozzle 29 and air then flows through the restriction 23 in a volume sufficient to raise the pressure in the branch line 24. Similarly, as the temperature of the thermostat 26 is reduced, the flapper valve 28 is withdrawn from the nozzle 29 and the pressure is reduced within the branch line 24.

It is desirable that the motor 14 position the damper 12 to a particular position for each value of temperature at the thermostat 26, and in accordance with my invention, a relay 32 is interposed between the branch line 24 and the line 33 leading to the bellows 17. In addition to the pneumatic connections between the relay 32 and the lines 24 and 33, there is provided a mechanical follow-up connection between the relay 32 and the motor 14, which engages the pressure plate 18 of the motor 14. The construction of the relay 32, together with its operation, will be more clearly brought out in connection with Figures 2 and 3.

The positive positioning relay 32 referred to in connection with Figure 1 is shown in detail in Figures 2 and 3. A hollow base member 35 has its two open ends covered by diaphragms 36 and 37, of equal area, to form a chamber 38. The base member is provided with a screw threaded connection 39 by which the chamber 38 may be connected to the line 33 leading to the bellows 17 of the motor 14. A cap 40 is secured to the base member 35 by means of screws 41. The cap 40, together with the screws 41, serves to clamp the diaphragm 36 to the base member 35. Likewise, the lower diaphragm 37 is clamped to the base member 35 by means of a cap 43 which is secured to the base member 35 by means of screws 44. The screws 44 also serve to secure a bracket member 45 to the base member 35 and the lower cap 43. The bracket 45 serves as a support for the device and is provided with a plurality of mounting holes 46 by means of which it may be secured to a motor unit. The upper cap 40 is provided with a screw-threaded connection by means of which it may be connected to the thermostat branch line 24 or to any other source of control pressure. The cap 40 is constructed to form a chamber 48 above the diaphragm 36 so that branch line pressure may be impressed on the diaphragm 36.

The interior of the base member 35 is so formed as to provide a pair of oppositely disposed ports which take the form of a supply nozzle 50 and a waste nozzle 51. The waste nozzle 51 is in communication with the exterior of the base member 35 through a bore 52, while the supply nozzle 50 is in communication with a screw-threaded connection 53 in the base member 35 through a bore 54. The connection 53 serves to connect the device to the pressure supply line 22. A pair of flapper valves 56 and 57 are pivotally supported within the interior of the base member 35 on the pins 58 and 59 respectively. A tension spring 60 interconnects the two flapper valves 56 and 57 and serves normally to keep the flapper valve 56 in engagement with the nozzle 50 and to keep the flapper valve 57 in engagement with the nozzle 51. The spring 60 is very light and its tension is just sufficient to hold the parts in their proper position no matter at what angle the device is mounted.

A member 62 has a portion which extends through the upper diaphragm 36 and is secured to a washer 63 on the reverse side thereof. Likewise, a member 64 has a portion which extends through the lower diaphragm 37 and is secured to a washer 65 on the reverse side of that diaphragm. The member 62 is screw threaded internally and carries therein a member 67 which passes through an opening 68 in the flapper valve 57. The member 67 is provided below the flapper valve 57 with an abutment 69, which is adapted to engage the flapper valve 57 to lift it from the nozzle 51. The member 64, which is supported by the lower diaphragm 37, carries an upwardly extending rod 70 on which is mounted an abutment 71 which is adapted to engage the flapper valve 56 to move it away from the nozzle 50 when the rod 70 is lowered. The abutment 69 on the member 67 is screw-threaded internally to receive the upper end of the rod 70, which is externally screw-threaded. It will be evident that when the member 67 is rotated with respect to the rod 70 the distance between the abutments 69 and 71 will be varied. It is desirable that the two flapper valves should positively close the ports in the nozzles 50 and 51 when in neutral position. Likewise, it is desirable that a very slight movement of the diaphragms 36 and 37 in either direction should cause opening of the proper port. In order to accomplish this purpose, it is necessary to be able to adjust the position of the diaphragm at which the supply port is open relative to the position of the diaphragm at which the waste port is open. Furthermore, it is necessary that this adjustment be capable of accomplishment after the device is completely assembled, otherwise accurate adjustment will not be possible, and further, it may be desirable to change this adjustment to meet various conditions of operation. In order to perform the above-mentioned adjustments of the present device, a suitable instrument is inserted through the screw-threaded connection in the upper part of the cap 40, and through the member 62 to engage the upper end of the member 67. A screw 74 is inserted in the upper end of the opening through the member 62 to seal that opening against the passage of air after the above-mentioned adjustment has been made.

The mechanical follow-up connection between the relay 32 and the motor 17 which is being controlled, includes a lever 76 which is pivoted in the bracket 45 at 77 and 78. The lever 76 engages a button 79 which extends downwardly from the member 64. A tension spring 81 is supported from the upper cap 40 on a member 82 and a screw 84. The screw 84 passes through a spring supporting nut 85 so that rotation of the screw 84 will provide an adjustment of the tension of the spring 81. The lower end of spring 81 engages the lever 76 and biases it in a direction to lift the diaphrams 36 and 37 upwardly against the pressure existing in the chamber 48. The purpose of the spring 81 is to provide a starting point adjustment for the relay, or in other words, determines the minimum branch line pressure at which the exhaust port 51 will be closed and the supply port 50 open. This pressure will depend on the requirements of the system in which the device and the motor are used.

A second lever 87 is pivoted in the bracket 45 at 88 and 89. A screw 90 extends between the lever 87 and lever 76 and serves as a force transmitting means therebetween. The screw 90 is adjustable in a longitudinal slot in the lever 87. When the screw 90 is tightened in a nut 91 which rests on the upper surface of lever 87, the nut 91 is drawn downwardly to hold the screw 90 in any adjusted position. By positioning the screw 90 at various positions in the slot in lever 87, various leverages between the lever 87 and the lever 76 may be obtained.

A tension spring 93 engages the right hand end of the lever 87 and is adapted to urge it in a counter-clockwise direction to exert an upward force on the diaphragms 36 and 37. The upper end of the spring 93 is positioned by a member 94 which is guided for vertical movement in a guide 95 which is secured to the upper surface of the cap 40. The lower extension of the member 94 is secured by means of screws 97 and spacers 98 to a member 99 which is adapted to engage the pressure plate 18 of motor 17 or for connection to any suitable part of the motor mechanism. The member 99 is provided with a longitudinal slot so that the relation between the member 94 and the member 99 may be varied by first loosening the screws 97. As seen in Figure 1, the member 99 engages the pressure plate 18 of the motor 14 and its position is therefore varied as the bellows 17 of the motor expands and contracts. The member 99 is guided in the bracket 45 for vertical movement with respect thereto, as seen in Figure 3. It will be seen, therefore, that as the position of the motor is varied, tension of the spring 93 is varied through the members 99 and 94. As these members are raised, the tension of the spring 93 will be increased and consequently, the lever 87 will be urged in a counter-clockwise direction, the lever 76 urged in a clockwise direction, and there will be a force tending to raise the diaphragms 36 and 37.

It will be seen that when the screw 90 is adjusted toward the left of the lever 87 that the spring 93 will have an increased leverage on the diaphragms 36 and 37 and that only a relatively small movement of the members 99 and 94 will be necessary to produce a given change in the upward force upon the diaphragms 36 and 37. Likewise, if the screw 90 is moved toward the right-hand end of the slot in lever 87, a larger movement of the motor will be necessary in order to effect a given change in the upward force of the diaphragms 36 and 37. This adjustment, together with the starting point adjustment previously described, serve to adapt the device to the particular application to which it is put.

It should be pointed out that, although a different pressure may exist in the chamber 38 than exists in the chamber 48, the position of the diaphragms will not be affected. The pressure within the chamber 38 acts equally and in opposite directions upon the diaphragm 36 and on the diaphragm 37, which are of the same area, so that its effect is entirely eliminated. This feature permits the pressure within the chamber 38 to rise and fall without any relation to the control pressure applied to chamber 48 and to the upper side of the diaphragm 36, and thereby position the motor or other device being controlled regardless of any friction or other forces opposing movement.

The operation of the device is as follows:

Assume that both the supply and waste ports are closed and that a predetermined pressure exists within the upper chamber 48. Also, assume that the members 99 and 94 are so positioned that the spring 93 exerts an upward force on the diaphragm just sufficient to counter-balance the effect of the pressure within the chamber 48. If the pressure within the branch line 24 from the thermostat 26 should increase, the diaphragm 36 will be moved downwardly to open the supply port by moving the flapper valve 56 away from the supply nozzle 50. Air under pressure will then enter the chamber 38 from the supply line 22, and this pressure will be transmitted to the bellows 17 of the damper motor 14. The supply port will remain open until such time as the motor 14 assumes a position at which the increased tension on the spring 93, acting through the levers 87 and 76, will counter-balance the increased pressure acting on the diaphragm 36, at which time the supply valve will again be closed. If the pressure within the branch line 24 is reduced, the tension on the spring 93 will be sufficient to raise the two diaphragms and move the flapper valve 57 away from the bleed nozzle 51. The pressure within the motor bellows 17 will then pass into the chamber 38 and out the waste port until the motor is moved to a position at which tension of the spring 93 acting through the levers 87 and 76 will just balance this new value of branch line pressure acting downwardly on the diaphragm 36. At this time the waste valve will again be closed. It will be noted that motor position depends only on branch line pressure and is independent, within the values of pressure available, of the force necessary to move the motor to the required position.

As pointed out heretofore, the invention is not limited to a device for positively positioning a motor in accordance with branch line pressure, but may be applied equally well to other types of relays well known to the pneumatic control art. Likewise, other modifications of the novel features of my invention will be apparent to those skilled in the art, and I am to be limited therefore only by the scope of the appended claims.

I claim as my invention:

1. In combination, a base member having a chamber therein, a diaphragm covering one end of said chamber, a plunger in said chamber positioned by said diaphragm, a supply valve in said chamber, a vent valve in said chamber, a pair of connecting means moved by said plunger for actuating said valves selectively, and means accessible through said diaphragm from the remote side of said diaphragm for relatively adjusting said connecting means.

2. In combination, first and second pressure chambers separated by a diaphragm, said first chamber being adapted to have a variable control pressure applied thereto, inlet and outlet valves for said second chamber, an actuator for said inlet valve for controlling the supply of a pressure fluid to said second chamber, an actuator for said outlet valve for controlling the exhaust of fluid from said second chamber, a member positioned by said diaphragm having a pair of abutments thereon for engaging said actuators and positioning said actuators in reverse senses with respect to said valves on movement of said diaphragm, and means for varying the relative position of said abutments.

3. In combination, a base member having a chamber therein, a first substantially flat diaphragm covering one end of the chamber, a second substantially flat diaphragm covering the other end of said chamber, supply and vent valve means between said diaphragms for controlling the pressure in the chamber, a plunger carried by said diaphragms, connections by which said plunger actuates said vent valve means at one position of said plunger and actuates said supply valve means at another position of said plunger, and means accessible through one of said diaphragms from the remote side of said diaphragm for adjusting said connections to determine the position of said plunger at which said supply valve means is actuated relative to the position of said plunger at which said vent valve means is actuated.

4. In combination, a base member having a chamber therein, a diaphragm separating said chamber into first and second portions, said base member having an opening therethrough for connecting the first portion of said chamber to a source of variable control pressure, said base member also having openings therethrough for connecting the second portion of said chamber with a source of fluid under pressure and for venting fluid from the second portion of said chamber and also for connecting the second portion of said chamber to a device to be controlled, a plunger in the second portion of said chamber positioned by said diaphragm, supply and vent valves in the second portion of said chamber for controlling the flow of a pressure fluid through the corresponding openings in said base member, a pair of connecting means associated with said plunger for actuating said valves selectively, and means accessible through one of the openings in said base member for relatively adjusting said connecting means.

5. In combination, means forming a pressure chamber, oppositely disposed pressure supply and exhaust ports in said chamber, a pair of flapper valves pivotally supported within said chamber for cooperating with said ports, a single means resiliently biasing said flapper valves toward their respective ports, diaphragm means dividing said chamber into first and second portions, and means actuated by said diaphragm means for moving said flapper valves out of engagement with said ports selectively.

6. In combination, first and second pressure chambers separated by a diaphragm, said first chamber being adapted to have a variable control pressure applied thereto, inlet and outlet ports in said second chamber, a flapper valve for cooperating with said inlet port in controlling the supply of a pressure fluid to said second chamber, a flapper valve for cooperating with said outlet port in controlling the exhaust of fluid from said second chamber, a member positioned by said diaphragm having a pair of abutments thereon for engaging said flapper valves for moving said valves in reverse senses with respect to the corresponding ports on movement of said diaphragm, and means for varying the relative position of said abutments.

7. In combination, a base member having a chamber therein, a diaphragm covering one end of said chamber, means within said chamber forming oppositely disposed supply and waste ports, a pair of flapper valves pivotally supported on the interior of said chamber for cooperating with said ports in determining the pressure within said chamber, a member within said chamber adapted to be positioned by said diaphragm, actuating means carried by said member for positioning said flapper valves with respect to said ports, and means accessible through said diaphragm from the remote side of said diaphragm for relatively adjusting said actuating means.

8. In combination, a base member having a chamber therein, a diaphragm separating said chamber into first and second portions, said base member having an opening therethrough for connecting the first portion of said chamber to a source of variable control pressure, means within the second portion forming supply and waste ports, a pair of flapper valves pivotally supported on the interior of said chamber for cooperating with said ports in controlling the supply and waste of a pressure fluid, a member within the second portion of said chamber adapted to be positioned by said diaphragm, actuating means carried by said member for positioning said flapper valves with respect to said ports, and means accessible through the opening in said base member for relatively adjusting said actuating means.

9. In combination, a base member having a chamber therein, a diaphragm separating said chamber into first and second portions, said base member having an opening therethrough for connecting the first portion of said chamber to a source of variable control pressure, means within the second portion forming supply and waste ports, a pair of flapper valves pivotally supported on the interior of said chamber for cooperating with said ports in controlling the supply and waste of a pressure fluid, a member within the second portion of said chamber adapted to be positioned by said diaphragm, actuating means carried by said member for positioning said flapper valves with respect to said ports, and means accessible on the side of said diaphragm remote from said member and through the opening in said base member for relatively adjusting said actuating means.

10. In combination, a fluid pressure actuated motor having an expansible chamber, means including a pair of spaced diaphragms forming a control chamber, a member operatively connecting said diaphragms, pressure inlet and outlet valves for said control chamber adapted to be actuated by movement of said diaphragms, a resilient mechanical connection between said motor and one of said diaphragms, a conduit providing a fluid connection between said chambers, and means for impressing a control pressure on the side of one of said diaphragms remote from said chamber, said connection comprising cooperating substantially parallel spaced levers fixedly pivoted at first opposite ends, resilient means associated with each of said levers at the second end thereof, each of said means biasing its associated lever into an operative position, fulcrum means for a first of said levers between said lever and said one of said diaphragms and adjustable substantially along the line of action of said lever, and fulcrum means for a second of said levers between said first lever and said second lever and adjustable substantially normally to the line of action of said second lever for adjusting the force arm of said second lever acting on said first lever.

11. In combination, a fluid pressure actuated motor having an expansible chamber, means including a pair of spaced diaphragms forming a control chamber, a member operatively connecting said diaphragms, pressure inlet and outlet valves for said control chamber adapted to be actuated by movement of said diaphragms, a resilient mechanical connection between said motor and one of said diaphragms, said mechanical connection comprising cooperating substantially parallel spaced levers fixedly pivoted at first opposite ends, resilient means associated with each of said levers at the second end thereof, each of said means biasing its associated lever into an operative position, fulcrum means for a first of said levers between said lever and said one of said diaphragms and adjustable substantially along the line of action of said lever, and fulcrum means for a second of said levers between said first lever and said second lever and adjustable substantially normally to the line of action of said second lever for adjusting the force arm of said second lever acting on said first lever, a conduit providing a fluid connection between said chambers, and means for impressing a control pressure on the side of one of said diaphragms remote from said control chamber, the remote side of the other of said diaphragms being subject to atmospheric pressure.

12. In combination, a fluid pressure actuated motor having an expansible chamber, means including a pair of spaced diaphragms forming a control chamber, means within said control chamber forming oppositely disposed supply and waste ports, a pair of flapper valves pivotally supported on the interior of said control chamber for cooperating with said ports in determining the pressure within said control chamber, a member within said control chamber adapted to move with said diaphragms, actuating means carried by said member for positioning said flapper valves with respect to said ports, a resilient mechanical connection between said motor and one of said diaphragms, said connection comprising cooperating substantially parallel spaced levers fixedly pivoted at first opposite ends, resilient means associated with each of said levers at the second end thereof, each of said means biasing its associated lever into an operative position, fulcrum means for a first of said levers between said lever and said one of said diaphragms and adjustable substantially along the line of action of said lever, and fulcrum means for a second of said levers between said first lever and said second lever and adjustable substantially normally to the line of action of said second lever for adjusting the force arm of said second lever acting on said first lever, a conduit providing a fluid connection between said chambers, and means for impressing control pressures on the sides of said diaphragms remote from said control chamber.

13. In combination, a fluid pressure actuated motor having an expansible chamber, means including a pair of spaced diaphragms forming a control chamber, means within said control chamber forming oppositely disposed supply and waste ports, a pair of flapper valves pivotally supported on the interior of said control chamber for cooperating with said ports in determining the pressure within said control chamber, a member within said control chamber adapted to move with said diaphragms, actuating means carried by said member for positioning said flapper valves with respect to said ports, means accessible through one of said diaphragms from the remote side of said diaphragm for relatively adjusting said actuating means, a resilient mechanical connection between said motor and one of said diaphragms, a conduit providing a fluid connection between said chambers, and means for impressing control pressures on the sides of said diaphragms remote from said control chamber.

14. In a pneumatic control device, in combination, a base member having a chamber therein, oppositely disposed supply and waste ports within said chamber, a pair of flapper valves pivoted within said chamber, for cooperating with said ports in controlling the flow of fluid therethrough, resilient means interconnecting said flapper valves and biasing each of said flapper valves into engagement with its associated port, and means for moving said flapper valves out of engagement with said ports selectively against the action of said resilient means.

15. In combination, a fluid pressure actuated motor having an expansible chamber, means including a pair of spaced diaphragms forming a control chamber, means within said control chamber forming oppositely disposed supply and waste ports, a pair of flapper valves pivotally supported on the interior of said control chamber for cooperating with said port in determining the pressure within said control chamber, a member within said control chamber adapted to move with said diaphragm, actuating means carried by said member for positioning said flapper valves with respect to said port, means accessible through one of said diaphragms from the remote side of said diaphragm for relatively adjusting said actuating means, a resilient mechanical connection between said motor and one of said diaphragms, said connection comprising cooperating substantially parallel spaced levers fixedly pivoted at first opposite ends, resilient means associated with each of said levers at the second end thereof, each of said means biasing its associated lever into an operative position, fulcrum means for a first of said levers between said lever and said one of said diaphragms and adjustable substantially along the line of action of said lever, and fulcrum means for a second of said levers between said first lever and said second lever and adjustable substantially normally to the line of action of said second lever for adjusting the force arm of said second lever acting on said first lever, a conduit providing a fluid connection between said chambers, and means for impressing control pressures on the side of said diaphragm remote from said control chamber.

FREDERICK D. JOESTING.

---

CERTIFICATE OF CORRECTION.

Patent No. 2,350,615.                                June 6, 1944.

FREDERICK D. JOESTING.

It is hereby certified that error appears in the printed specification of the above numbered patent requiring correction as follows: Page 1, second column, line 25, strike out the words "by means of"; and that the said Letters Patent should be read with this correction therein that the same may conform to the record of the case in the Patent Office.

Signed and sealed this 12th day of September, A. D. 1944.

(Seal)

Leslie Frazer
Acting Commissioner of Patents.

CERTIFICATE OF CORRECTION.

Patent No. 2,350,615. June 6, 1944.

FREDERICK D. JOESTING.

It is hereby certified that error appears in the printed specification of the above numbered patent requiring correction as follows: Page 1, second column, line 25, strike out the words "by means of"; and that the said Letters Patent should be read with this correction therein that the same may conform to the record of the case in the Patent Office.

Signed and sealed this 12th day of September, A. D. 1944.

(Seal)

Leslie Frazer
Acting Commissioner of Patents.